United States Patent Office 2,716,607
Patented Aug. 30, 1955

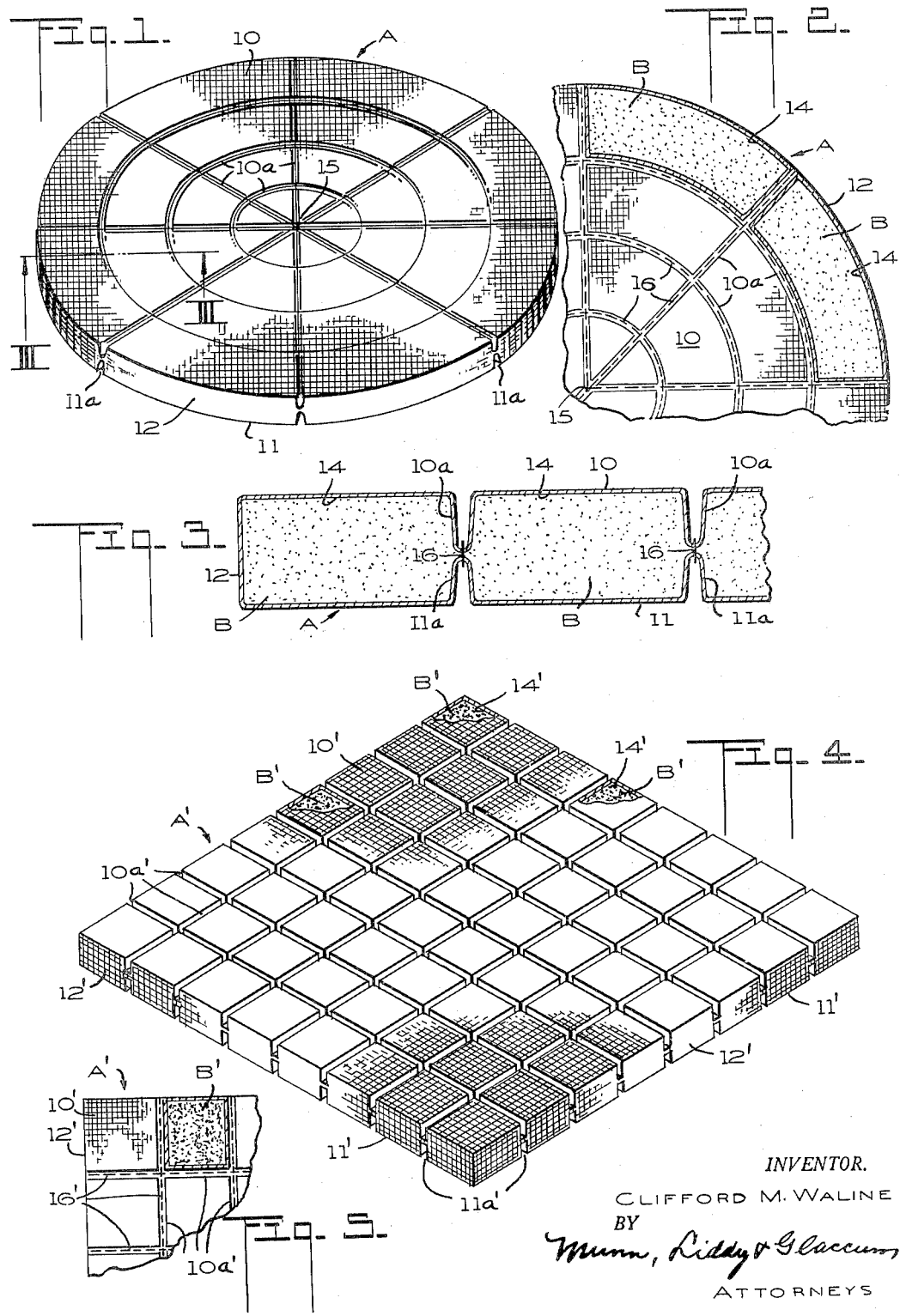

2,716,607

BEVERAGE-BREWING BAG

Clifford M. Waline, Oakland, Calif.

Application March 9, 1951, Serial No. 214,689

1 Claim. (Cl. 99—77.1)

The present invention relates to improvements in a beverage-brewing bag. It consists of the combinations, constructions, and arrangement of parts of the bag, as hereinafter described and claimed.

An object of my invention is to provide a beverage-brewing bag, containing a substance from which a beverage is to be made; this bag being fashioned for maintaining the substance in a spread-out condition for ready contact by a liquid; and at the same time precluding the substance from bunching to a particular part of the bag. This bag is made from a poriferous material, allowing easy flow of liquid therethrough, yet filtering out the sediment from the substance, and precluding the sediment from draining from the bag.

Briefly stated, my improved beverage-brewing bag is provided on its interior with intersecting barriers, which subdivided the bag into a plurality of separate compartments. The substance to be brewed is disposed in these compartments.

When utilized for brewing coffee, for instance, the bag affords complete contact between the water and the ground coffee during the entire brewing time. This in turn shortens the brewing period, which prevents a bitter taste in brewed coffee.

Other objects and advantages will appear as the specification continues. The novel features will be pointed out in the claim hereunto annexed.

Drawing

For a better understanding of my invention, reference should be had to the accompanying drawing, forming part of this application, in which:

Figure 1 is an isometric view of a circular pad-like beverage-brewing bag made in accordance with this invention;

Figure 2 is an enlarged top plan view of one of the quadrants of Figure 1, with parts shown in section;

Figure 3 is a fragmentary vertical sectional view taken along the line III—III of Figure 1;

Figure 4 is an isometric view of a square pad-like bag, partly in section; and

Figure 5 is a top plan view of a corner of this square bag, with a portion in section.

While I have shown only the preferred forms of my invention, it should be understood that various changes, or modifications, may be made within the scope of the appended claim without departing from the spirit thereof.

Detailed description

Referring to the first embodiment of the invention, as shown in Figures 1 to 3, inclusive, I provide a beverage-brewing bag designated generally at A. The substance from which a beverage is to be made, for example coffee B, is disposed in the interior of this bag.

As shown, the bag A includes upper and lower panels 10 and 11, respectively, which are interconnected by a marginal wall 12. This entire bag is fashioned from a poriferous material having interstices through which a liquid will pass. However, these interstices are small enough that the bag will filter out sediment from the substance B, preventing this sediment from draining from the bag into the brewed beverage.

The interior of this bag is subdivided into a plurality of separate compartments 14, in which the substance B is disposed so as to maintain the latter in spread-out condition ready for contact by the liquid. These compartments preclude the substance from bunching to a particular part of the bag. It will be noted that these compartments cover the entire area of the bag.

For the purpose of subdividing the bag into these separate compartments, I have disclosed the panels 10 and 11 as having intersecting creases 10a and 11a formed therein to extend inwardly of the bag A. The creases of one panel register with those of the other panel. The creases are formed by portions of the panels extending substantially laterally of the main panel surfaces to a base below the surface of the panels and substantially midway therebetween. The base is formed by the contiguous elements of the opposite panels and by means for securing the contiguous elements to each other. As illustrated in Figures 1 and 2, this bag is circular. Certain of these creases extend concentrically around the center 15, while others are arranged radially.

It will be apparent from Figure 3 that the creases 10a and 11a provide barriers on the interior of the bag A, which define the compartments 14. Any suitable means may be provided for securing the registering creases together to form the base described above; and for this purpose I have shown stitching 16. This stitching is arranged within the creases to extend both concentrically and radially of the disc-like bag A. Inasmuch as these creases extend over the exterior surfaces of the panels, they define liquid-conveying channels, which serve to distribute the liquid over the bag.

Turning now to the second embodiment of my invention, as illustrated in Figures 4 and 5, the bag A' is square in outline. This bag follows the same general construction as the bag A in the first form, excepting for its shape.

It will be observed that the modified bag A' has upper and lower panels 10' and 11', which are interconnected by a marginal wall 12'. Criss-cross creases 10a' and 11a' are fashioned in these panels, respectively, and extend inwardly of the bag to provide separate compartments 14' for the substance B' (see Figure 5). As in the first embodiment, the creases 10a' and 11a' register with one another, and are secured together by stitching 16' arranged at the bottom of these creases. The latter serve to distribute the liquid over the bag A'.

As in the first embodiment, the bag A' is made from a poriferous material that will allow the liquid to pass through the interstices thereof, while retaining sediment from the substance B' against draining out of the bag into the brewed beverage.

The facing portions of the panels forming each crease are separated at the base by a distance substantially equal to the lateral width of the stitching. Thus, the portions are closely adjacent each other.

The bags herein disclosed are to be used in brewers of a percolating, steeping, dripping, or any similar method or combination of these methods. Moreover, other substances, such as tea, may be substituted for the coffee. These bags may be made of any shape desired, and fashioned from any suitable material. However, the bags should permit free contact between the liquid and the substance to be brewed, while at the same time precluding sediment from coming through the bag into the beverage.

I claim:

In a beverage-brewing bag comprising upper and lower panels fashioned from a poriferous material having interstices through which a liquid will pass while filtering out sediment from a brewable substance contained within the bag, the bag further including a marginal wall interconnecting these panels, each panel having intersecting creases therein extending inwardly of the bag laterally of the panels with the creases in one panel arranged in registration with the creases in the other panel, said intersecting creases being formed by portions of the panels extending substantially laterally of the panel surfaces to a base interconnecting said portions below the surfaces of said panels and substantially midway between the two panels, and fastening means extending along said bases and interconnecting said bases to provide barriers for dividing the interior of the bag into a plurality of separate compartments, the facing portions of the compartments being disposed closely adjacent each other with the facing portions of said panels forming said compartments and forming each crease being separated at said base by a distance substantially equal to the lateral width of the fastening means and each compartment containing a quantity of the brewable substance.

References Cited in the file of this patent

UNITED STATES PATENTS

| | | |
|---|---|---|
| 1,075,210 | Heyl et al. | Oct. 7, 1913 |
| 2,149,713 | Webber | Mar. 7, 1939 |
| 2,460,735 | Carroll | Feb. 1, 1949 |